United States Patent
Waller, Jr. et al.

(10) Patent No.: US 6,383,612 B1
(45) Date of Patent: *May 7, 2002

(54) INK-DRYING AGENTS FOR INKJET RECEPTOR MEDIA

(75) Inventors: Clinton P. Waller, Jr., White Bear Lake; Omar Farooq, Woodbury, both of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,961

(22) Filed: Jun. 19, 1998

(51) Int. Cl.$^7$ .............................. B41M 5/00; B32B 3/26
(52) U.S. Cl. ................. 428/195; 428/305.5; 428/308.4; 347/105
(58) Field of Search ................. 428/195, 207, 428/305.5, 306.6, 308.4, 308.8, 411.1, 913; 427/258, 261; 347/96, 105; 106/310; 562/30, 45

(56) References Cited

U.S. PATENT DOCUMENTS

| | | | |
|---|---|---|---|
| 4,247,498 A | 1/1981 | Castro | 264/41 |
| 4,419,388 A | 12/1983 | Sugiyama et al. | 427/288 |
| 4,474,847 A | 10/1984 | Schröder et al. | 428/323 |
| 4,539,256 A | 9/1985 | Shipman | 428/315.5 |
| 4,547,405 A | 10/1985 | Bedell et al. | 427/256 |
| 4,554,181 A | 11/1985 | Cousin et al. | 427/261 |
| 4,613,441 A | 9/1986 | Kohno et al. | 210/500.36 |
| 4,649,064 A * | 3/1987 | Jones | 427/256 |
| 4,726,989 A | 2/1988 | Mrozinski | 428/315.5 |
| 4,732,786 A | 3/1988 | Patterson et al. | 427/261 |
| 4,741,969 A | 5/1988 | Hayama et al. | 428/514 |
| 4,775,594 A * | 10/1988 | Desjarlais | 428/421 |
| 4,781,985 A | 11/1988 | Desjarlais | 428/421 |
| 4,867,881 A | 9/1989 | Kinzer | 210/490 |
| 4,877,680 A | 10/1989 | Sakaki et al. | 428/332 |
| 4,892,779 A | 1/1990 | Leatherman et al. | 428/200 |
| 4,903,039 A | 2/1990 | Light | 346/1.1 |
| 4,903,040 A | 2/1990 | Light | 346/1.1 |
| 4,935,307 A | 6/1990 | Iqbal et al. | 428/500 |
| 4,954,395 A | 9/1990 | Hasegawa et al. | 428/318.4 |
| 5,079,319 A | 1/1992 | Mueller | 526/238.23 |
| 5,084,340 A | 1/1992 | Light | 428/327 |
| 5,102,731 A | 4/1992 | Takimoto et al. | 428/323 |
| 5,120,594 A | 6/1992 | Mrozinski | 428/195 |
| 5,126,194 A | 6/1992 | Light | 428/327 |
| 5,126,195 A | 6/1992 | Light | 428/327 |
| 5,141,790 A | 8/1992 | Calhoun et al. | 428/40 |
| 5,147,410 A | 9/1992 | Heindl et al. | 8/555 |
| 5,156,674 A * | 10/1992 | Cells | 106/20 |
| 5,206,071 A | 4/1993 | Atherton et al. | 428/195 |
| 5,208,092 A | 5/1993 | Iqbal | 428/195 |
| 5,220,346 A * | 6/1993 | Carreira et al. | 346/1.1 |

(List continued on next page.)

FOREIGN PATENT DOCUMENTS

| | | |
|---|---|---|
| DE | 196 28 341 | 1/1998 |
| EP | 0 199 874 | 11/1986 |
| EP | 0 457 728 A1 | 11/1991 |
| EP | 0 484 016 A1 | 5/1992 |
| EP | 0 570 515 B1 | 11/1993 |
| EP | 0 614 771 | 9/1994 |
| EP | 0 627 324 A1 | 12/1994 |
| EP | 0 661 168 A2 | 7/1995 |
| EP | 0 667 246 | 8/1995 |
| EP | 0 673 782 | 9/1995 |
| EP | 0 716 931 A1 | 6/1996 |
| EP | 0 736 392 | 10/1996 |
| EP | 0 791 473 A2 | 8/1997 |
| EP | 0 839 880 A1 | 5/1998 |

(List continued on next page.)

OTHER PUBLICATIONS

R.E. Kesting, *Synthetic Polymeric Membranes*: Structural Perspective, 2d ed., John Wiley & Sons, 1985 Chapter 7, pp. 237–285. (No month).

Hornby et al., "Acrylidone Anionic Copolymers," International Specialty Products (brochure), Reprinted from *Soap/Cosmetics/Chemical Specialties* (Jun. 1993) 5 pgs.

International Specialty Products (brochure), Industrial Reference Guide, "Polymers—Polyvinylpryrrolidone," 2 pgs. (date not given).

International Specialty Products (brochure), Polyvinylpyrrolidone Polymers, "PVP", 16 pgs. (date not given).

International Specialty Products (brochure), "Acrylidone™ Anionic Polymers," 6pgs. (date not given).

Porterfield, William W., *Inorganic Chemistry*, Addison–Wesley Publishing Company, Inc., p. 133 (1984). (no month).

*Encyclopedia of Polymer Science and Engineering* vol. 17, pp. 204–214, 229, 234–235, John Wiley & Sons, Inc. (1989). (no month).

*Primary Examiner*—Marie Yamnitzky
(74) *Attorney, Agent, or Firm*—Carolyn V. Peters

(57) ABSTRACT

A drying agent for inkjet receptor media is disclosed. The drying agent can be an aromatic or aliphatic acid having sulfonic, carboxylic, phenolic or mixed functionalities thereof, which in combination with a multivalent salt is capable of drying the film in a manner to obtain a smudge-free rapidly dried image onto and in the medium when the image is printed. Methods of using the drying agent in a coating solution, on and in an inkjet receptor media, and in interaction with inkjet inks are also disclosed.

25 Claims, No Drawings

U.S. PATENT DOCUMENTS

| | | | |
|---|---|---|---|
| 5,229,207 A | 7/1993 | Paquette et al. | 428/355 |
| 5,262,238 A | 11/1993 | Trouve et al. | 428/402 |
| 5,296,277 A | 3/1994 | Wilson et al. | 428/40 |
| 5,302,437 A | 4/1994 | Idei et al. | 428/195 |
| 5,342,688 A | 8/1994 | Kitchin et al. | 428/402 |
| 5,362,516 A | 11/1994 | Wilson et al. | 427/207.1 |
| 5,374,475 A | 12/1994 | Wälchli | 428/304.4 |
| 5,380,044 A | 1/1995 | Aitkens et al. | 283/67 |
| 5,389,723 A | 2/1995 | Iqbal et al. | 525/57 |
| 5,428,383 A * | 6/1995 | Shields et al. | 347/96 |
| 5,429,860 A | 7/1995 | Held et al. | 428/195 |
| 5,443,727 A | 8/1995 | Gagnon | 210/490 |
| 5,445,868 A | 8/1995 | Harasawa et al. | 428/206 |
| 5,500,668 A * | 3/1996 | Malhotra et al. | 347/105 |
| 5,518,534 A * | 5/1996 | Pearlstine et al. | 106/20 R |
| 5,537,137 A | 7/1996 | Held et al. | 347/105 |
| 5,569,529 A | 10/1996 | Becker et al. | 428/331 |
| 5,624,484 A | 4/1997 | Takahashi et al. | 106/31.75 |
| 5,640,187 A * | 6/1997 | Kashiwazaki et al. | 347/101 |
| 5,677,067 A | 10/1997 | Kojima et al. | 428/478.2 |
| 5,679,143 A * | 10/1997 | Looman | 106/20 R |
| 5,681,660 A | 10/1997 | Bull et al. | 428/500 |
| 5,683,793 A | 11/1997 | Malhotra et al. | 428/216 |
| 5,686,602 A | 11/1997 | Farooq et al. | 536/101 |
| 5,688,603 A | 11/1997 | Iqbal et al. | 428/532 |
| 5,695,820 A * | 12/1997 | Davis et al. | 427/261 |
| 5,707,722 A | 1/1998 | Iqbal et al. | 428/304.4 |
| 5,731,430 A | 3/1998 | Fuertes et al. | 536/58 |
| 5,747,148 A | 5/1998 | Warner et al. | 428/212 |
| 5,789,342 A | 8/1998 | Evans et al. | 503/227 |
| 5,800,919 A | 9/1998 | Peacock et al. | 428/355 |
| 5,863,662 A | 1/1999 | Hornby et al. | 428/483 |
| 5,874,143 A | 2/1999 | Peloquin et al. | 428/40.1 |
| 5,885,337 A | 3/1999 | Nohr et al. | 106/31.27 |
| 6,054,213 A | 4/2000 | Peacock et al. | 428/355 |
| 6,071,614 A * | 6/2000 | Farooq | 428/403 |
| 6,177,187 B1 | 1/2001 | Niemoller et al. | 428/327 |

FOREIGN PATENT DOCUMENTS

| | | |
|---|---|---|
| EP | 0 876 914 B1 | 11/1998 |
| EP | 0 878 319 A2 | 11/1998 |
| EP | 0 894 641 | 2/1999 |
| EP | 0 897 808 | 2/1999 |
| GB | 2 147 003 | 5/1985 |
| JP | 61-41585 | 2/1986 |
| JP | 61-261089 | 11/1986 |
| JP | 61 063476 | 4/2001 |
| WO | WO 93/01938 | 2/1993 |
| WO | WO93/25595 | 12/1993 |
| WO | WO 95/28285 | 10/1995 |
| WO | WO 96/18496 | 6/1996 |
| WO | WO 97/20697 | 6/1997 |
| WO | WO97/33758 | 9/1997 |
| WO | WO 98/02314 | 1/1998 |
| WO | WO 98/05504 | 2/1998 |
| WO | WO 98/05512 | 2/1998 |
| WO | WO98/29516 | 7/1998 |
| WO | WO 98/30749 | 7/1998 |
| WO | WO 99/03685 | 1/1999 |
| WO | WO 99/06219 | 2/1999 |
| WO | WO 99/07588 | 2/1999 |

* cited by examiner

US 6,383,612 B1

INK-DRYING AGENTS FOR INKJET RECEPTOR MEDIA

FIELD OF INVENTION

This invention relates to a microporous inkjet receptor that provides excellent images with pigmented inks deposited thereon in a manner that allows fast drying of the pigmented inks when it is dispensed.

BACKGROUND OF INVENTION

Inkjet imaging techniques have become vastly popular in commercial and consumer applications. The ability to use a personal computer and desktop printer to print a color image on paper or other receptor media has extended from dye-based inks to pigment-based inks. The latter provide brilliant colors and more durable images because pigment particles are contained in a dispersion before being dispensed using a thermal inkjet print head, such as those commercially available from Hewlett Packard Corporation or LexMark Corporation in inkjet printers commercially available from Hewlett Packard Corporation, Encad Inc., Mimaki Corporation, and others.

Inkjet printers have been in general use for wide-format electronic printing for applications such as, engineering and architectural drawings. Because of the simplicity of operation, economy of inkjet printers, and improvements in ink technology the inkjet imaging process holds a superior growth potential promise for the printing industry to produce wide format, image on demand, presentation quality durable graphics.

The components of an inkjet system used for making graphics can be grouped into three major categories:
1 Computer, software, printer.
2 Ink.
3 Receptor sheet.

The computer, software, and printer will control the size, number and placement of the ink droplets and will transport the receptor film. The ink will contain the colorant or pigments which form the image and the receptor film provides the medium which accepts and holds the ink. The quality of the inkjet image is a function of the total system. However, the composition and interaction between the ink and receptor film is most important in an inkjet system.

Image quality is what the viewing public and paying customers will want and demand to see. Many other demands are also placed on the ink jet media/ink system from the print shop, such as rapid drying, humidity insensitivity, extended shelf life, waterfastness and overall handleability. Also, exposure to the environment can place additional demands on the media and ink (depending on the application of the graphic).

Porous membrane is a natural choice to use as an ink jet receptive media because the capillary action of the porous membrane can wick the ink into the pores much faster than the absorption mechanism of film forming water soluble coatings. However, in the past, when a porous coating or film has been employed to achieve desired quick dry, optical density has suffered greatly because the colorant penetrates too deep into the porous network. This type of problem is magnified by printers that dispense high volumes of ink per drop because extra film thickness may be required to hold all the ink. When the pore size and pore volume of the membrane are opened to allow the pigments to penetrate, the pigments can be stratified in the membrane. Meaning, the black, cyan, magenta, and yellow will be predominately found at different depths depending on the order of application. Hence, some of the first color(s) applied is /are optically trapped in the image by subsequent application of other pigmented ink. Furthermore, lateral diffusion of the ink can also be a problem inherent in porous membranes used as receptive media. When pigmented inks are jetted onto a porous film that has a pore size that is too small, color pigments will be filtered on the top of the membrane rendering high image density, but the pigments could easily smear and have the effect of never drying. Also, excess fluid from the ink can coalesce, or even worse, pool and run on the image before the water/glycol carrier is wicked away.

The chemical formulation of the pigmented inkjet ink has considerable complexity due to the requirement of continued dispersion of the pigment particles in the remainder of the ink and during jetting of the ink.

The typical consumer medium for receiving dye-based inkjet inks has been paper or specially coated papers. However, with too much inkjet ink in a given area of the paper, one can see the over-saturation of the paper with the aqueous ink in which dye was dissolved.

As inkjet inks have become more commercially oriented and pigmented-based inks have become more prevalent, different media have been tried in an attempt to control the management of fluids in the ink.

Japanese Patent JP 61-041585 discloses a method for producing printing material using a ratio of PVA/PVP. The disadvantage is inadequate waterfastness and wet rub off properties.

Japanese Patent JP61-261089 discloses a transparent material with cationic conductive resin in addition to a mixture of PVA/PVP. The material is water fast and smudge proof but the wet rub off properties are poor.

European Patent Publication EP 0 716 931 A1 discloses a system using a dye capable of co-ordinate bonding with a metal ion in two or more positions. Again binder resins are used with inorganic pigments in the paper or film. The metal ion was preferred to be jetted on before imaging and additional heating is necessary to complete the reaction. This system was not claiming to be water fast, the focus was long term storage without fading from heat or light.

U.S. Pat. No. 5,537,137 discloses a system to achieve waterfastness by curing with heat or UV light. In the body of the patent, examples of their coatings contained Ca++ from $CaCi_2$. This was added to provide reactive species for the acid groups on the dispersed polymer. The coating remains water soluble until UV or heat curing after imaging.

Hence, the current special ink jet media employ absorptive components, and sometimes optional additives to bind the inks to the media. As a consequence current media are inherently moisture sensitive and can be fragile to handling and subject to finger smearing. Moreover, the vehicle absorptive components usually consist of water soluble (or swelling) polymers which result in slower printing speeds and dry times.

Pigmented ink delivery systems have also dealt with pigment management systems, wherein the resting location of the pigment particles are managed to provide the best possible image graphic. For example, copending, coassigned, U.S. Pat. No. 5,747,148 (Warner et al.), now allowed, discloses a pigment management system in which a suitable supporting layer (including in a listing a microporous layer) has a two layer fluid management system: a protective penetrant layer and a receptor layer, both layers containing filler particles to provide two different types of protrusions from the uppermost protective penetrant layer. Electron microphotographs in that application show how the pigment particles of the ink encounter smooth protrusions that provide a suitable topography for pigment particle "nesting" and rocky protrusions that assist in media handling and the like.

Other ink receptors have been disclosed, including U.S. Pat. Nos. 5,342,688 (Kitchin); 5,389,723 and 4,935,307 (both Iqbal et al.); 5,208,092 (Iqbal) 5,302,437 (Idei et al); U.S. Pat. No. 5,206,071 (Atherton et al.); and EPO Patent Publication 0 484 016 A1.

One prior activity has combined a fluid management system with a pigment management system, as disclosed in copending, coassigned, U.S. patent application Ser. No. 08/892,902 (Attorney Docket No.53473USA1A), the disclosure of which is incorporated herein by reference. This work solves the need for an ink jet receptor to have both a pigment management system for flocculating or agglomerating incoming ink and a fluid management system for efficiently dispensing with the carrier fluids within a porous substrate.

SUMMARY OF INVENTION

It has been found that inkjet receptor media requires durability for exposure to a variety of solvents, most often water in the form of humidity, rain, dew, snow, and the like.

It has also been found that pigment particles in aqueous inkjet ink formulations require time to establish a stable relationship with the medium upon which they have been deposited during inkjet printing.

It has been found that pigment-based inks are not completely rapidly free from smudging when it is dispensed onto a porous inkjet receptor medium, even if such receptor medium is impregnated with both a fluid management system and a pigment management system.

What the art needs is an inkjet receptor medium that assures rapid drying of the ink reflected in a bleed-free, feathering-free and smudge-free image whereby the ink is restrained onto and in the medium so that the image is dry and stable, particularly when the printed medium is likely to be exposed to water or other solvents shortly after printing.

Furthermore, the art needs an inkjet receptor medium that contains such ingredients, components or compounds to effectively interact with certain components such as the humectants of the inks being used so that a completely dry image surface is obtained after printing.

Furthermore, the art needs a drying agent for rapidly drying a printed inkjet image on a receptor medium. "Drying agent" means an agent, component, ingredient or compound which can dry or make the pigment feel dry to touch via chemically or physicochemically occlusion or interaction with certain components such as the humectant or other slow drying components in the pigmented inks used in printing the image onto the receptor medium. Specifically, "dry to touch" means, an indistinguishable "feel" between the imaged and the unimaged areas of the substrate regardless of whether, technically, all volatiles have evaporated from the imaged area.

One aspect of the present invention is a drying agent for inkjet receptor media,comprising an aromatic or aliphatic acid having sulfonic, carboxylic, phenolic or mixed functionalities thereof, which in combination with a multivalent salt and a surfactant is capable of drying the medium in a manner to obtain a smudge-free rapidly dried image onto and in the medium when the image is printed. The aromatic acid can be heterocyclic. Preferably, the acid can be a sulfocarboxylic or sulfophenolic acid. Preferably, the invention provides its best features and advantages in wide-format inkjet printers, e.g., Hewlett Packard Corporation (HP) brand 2500 series printers that operate on low ink-drop volume. "Low drop volume" for this invention means below 70 picoliters per drop.

One feature of the present invention is an aromatic or aliphatic sulfocarboxylic or sulfophenolic acid such that when the medium is impregnated with such composition and dried, the image becomes rapidly smudge-free.

Other features and advantages of the invention will be disclosed in relation to the embodiments of the invention.

EMBODIMENTS OF INVENTION

Inkjet Receptor Medium

The inkjet receptor medium can be any porous membrane or film known to those skilled in the art wherein it is desired to print inkjet inks on at least one major surface thereon. Preferably, the medium comprises an inkjet receptor medium, comprising a porous substrate having a fluid management system and having a pigment management system in contact with surfaces of pores of the substrate therein, such as disclosed in copending, coassigned, U.S. patent application Ser. No. 08/892,902 (Attorney Docket No. 53473USA1A), the disclosure of which is incorporated herein. The pigment management system includes a multivalent metal salt coating or functionalized particulates impregnated in pores of the porous substrate such that they are in contact with surfaces of pores of the porous substrate. One embodiment of that medium is an inkjet receptor comprising a microporous membrane impregnated with a multivalent metal salt together with a surfactant or combination of surfactants chosen for the ink and membrane being employed.

Another embodiment is an inkjet receptor comprising a microporous membrane impregnated with a microporous fluorinated silica agglomerate together with a binder and a surfactant or a combination of surfactants for the ink and membrane being employed.

Another embodiment of the present invention is an inkjet receptor comprising a microporous membrane impregnated with a microporous fluorinated silica agglomerate together with a binder and a surfactant or combination of surfactants wherein the surfactants are selected from the group of hydrocarbon-based anionic surfactants, silicon-based non-ionic surfactants or fluorocarbon-based non-ionic based surfactants or a combination thereof.

These receptors, when imaged in an inkjet printer, provide very high density and very high quality images which are tack-free and instantaneously dry to touch.

The ink colorant is typically a pigment dispersion having a dispersant that binds to the pigment and that will destabilize, flocculate, agglomerate, or coagulate the pigments on contact with the media component. Depositing each of the colors at or just below the surface of the membrane allowing the carrier fluid to wick into the membrane where the fluid management system can take over while providing a sheltered location for the pigments as managed by the pigment management system.

More preferably, the inkjet receptor medium uses a Thermally Induced Phase Separated (T.I.P.S.) microporous membrane according the disclosures of U.S. Pat. Nos. 4,539,256 (Shipman et al.), U.S. Pat. No. 4,726,989 (Mrozinski), and more particularly U.S. Pat. No. 5,120,594 (Mrozinski), and available from 3M. For optimization, the pore size and pore volume of the porous film can be adjusted for the model or make of the ink jet printer to correctly hold the volume of ink dispensed by the printer ensuring the highest possible image quality. The coating on the preferred media/ink set has special utility in the demanding ink jet printing applications found in commercial printing. Thus, one can "fine tune" the properties of these receptors to deal with the variables of inkjet ink delivery, including without limitation: porosity of media, pore size, surface wetting energy, and other capacity issues for media to receive ink of various formulations and drop volumes. Moreover, these media exhibit a complex porosity in its porous material that provides both a tortuous path for fluid management and a tortuous path that ensnares the pigment initially and continually during ink delivery.

Pigment Drying agents

Pigment drying agents useful in the present invention can be an aromatic or aliphatic acids having sulfonic, carboxylic, phenolic or mixed functionalities thereof.

Preferably, aromatic sulfonic and carboxylic acids have been found in this invention to be very effective in the presence of multivalent metal salts and suitable surfactant and binder, to serve as drying agents for inkjet receptor media. These acids can be of various types, chosen according to properties and distinguished by extent of their solubility in water and how that solubility affects drying performance.

At one end of the range of candidate acids, their higher solubility in water can interfere with other components in the media, such as a migration inhibitor as disclosed in copending, coassigned, U.S. patent application Ser. No. 09/099,956 (Attorney Docket No. 54191USA7A) thereby perhaps requiring a greater concentration of drying agent to be included in the coating. One example of this type of acid is a sulfocarboxylic acid such as sulfosalicylic acid.

At the other end of the range of candidate acids, the candidate acids with lower solubility in water would perform the drying function excellently but could require more aggressive solvent(s) to be impregnated into the media. One example of this type of acid is a phthalic acid so long as it is recognized that impregnating the receptor media will be more challenging because of the acid's lower solubility. To overcome impregnating limitations, lower solubility acid candidates, such as aromatic carboxylic acids, can be derivatized to become a monosodium salt (or any other similar alkali metal salt), the solubility of that salt in water is enhanced. One example of this type of acid-salt is an aromatic carboxylic acid, sodium salt such as ortho-phthalic acid-sodium salt. Furthermore, the aromatic carboxylic acids are also sufficiently soluble in water when the aromatic moiety contains at least one sulfonic acid group attached to the aromatic ring either as acid or as its sodium salt (or other alkali metal salts). Two examples of these candidates are 5-sulfoisophthalic acid and also its monosodium salt.

Other functional groups such as —OH group can be attached to the aromatic moiety to increase the solubility of the aromatic carboxylic group. Examples in this category are hydroxy-aryldicarboxylic acid isomers.

A related factor to choice of lower water solubility candidate acid is the amount of the acid to be included in the receptor media. The relationship is generally such that the lower solubility acid candidates are needed in smaller amounts than the higher solubility acid candidates. Generally, an acid used in the present invention can be present in the receptor medium in an amount ranging from about 1 to about 20 weight percent of the total coating weight of compositions with which the medium is impregnated with a fluid management system/pigment management system according to the disclosure of copending, coassigned, U.S. patent application Ser. No. 08/892,902 (Waller et al.) Attorney Docket No. 53473USA1A), the disclosure of which is incorporated by reference herein. Preferably, the amount ranges from about 4 to about 15 weight percent. Thus, a sodium salt of an aromatic sulfocarboxylic acid should be present in an amount in the higher end of the range (e.g., about 15 weight percent), whereas a carboxylic acid should be present in an amount in the lower end of the range (e.g., about 5 weight percent).

Moreover, free acid and salt forms of that acid can be combined for controlled tailoring of impregnation processing and resulting drying performance.

The acid or its salt can be impregnated into the media by adding it to a coating solution otherwise being impregnated into the media for fluid management and pigment management purposes. Suitable coating solutions and impregnation techniques are disclosed in copending, coassigned, U.S. patent application Ser. No. 08/892,902 (Attorney Docket No. 53473US1A), the disclosure of which is incorporated by reference herein, for coating on the inkjet receptor medium. Typically, the coating solution comprises a multivalent, a suitable surfactant, an alcohol and water. The weight percent of the acid/salt being used usually ranges from about 40 to about 60 weight percent and more preferably from about 45 to about 55 weight percent of the total solids in the composition.

The organic aromatic acids and their salts can be represented by the following general formula:

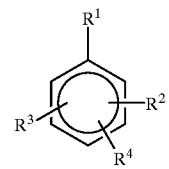

a: $R^1$, $R^2$, $R^3$ may be —COOH, —$SO_3H$ or —OH groups and combination totaling 3–5 groups. $R^4$ may be H. The acid functional groups may be in their alkali-metal salt form.

b: $R^4$ may be another aromatic group linked via a —$(CH_2)_n$—, —O—, —S—, —NH—, —NHCO—, —CO—bridge wherein n may vary from 0–3 and the second aromatic group may contain the same functionalities ($R^1$, $R^2$, $R^3$) totaling 3–5 groups as the first aromatic group.

c: $R^4$ may represent a part of a condensed aromatic system (a fused ring or rings, e.g., anthracene, phenanthrene etc).

The organic aliphatic acids used in the present invention can be represented by the following general formula:

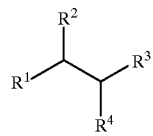

a: $R^1$, $R^2$, $R^3$ may be —COOH, —$SO_3H$ or —OH groups and combination thereof totatling 2–3 groups in the chain $R^4$ may be H. The acid functional groups may be in their alkali-metal salt form.

b: $R^4$ may be an aryl group containing sulfonic or sulfocarboxylic or sulfophenolic acid groups, their alkali metal salts, or combination thereof.

Nonlimiting examples of acceptable aromatic acids are sulfosalicyclic acid, disulfosalicylic acid, sulfophthalic acid, sulfoisophthalic acid, sulfoterephthalic acid, disulfodicarboxylic acid, sulfophenolic acid, hydroquinone sulfonic acid, hydroquinone disulfonic acids, sulfocarboxyphenolic acid, 5-hydroxy-phthalic acids, and the like. Also, the acids can be used in the present invention as their alkali metal salts (e.g., mono-, dicarboxylate or -sulfonates or phenolate). The di-, tri- and their higher homologues of the acids tend to be less soluble in water than both in their acid and mono-alkali-metal saltform. It is desirable that mono-, di- and tricarboxylic acids be used either as acids or their alkali-metal salts.

Additionally, aliphatic acids are candidates for use in the present invention because of their solubility in water. Nonlimiting examples of these acids are sulfosuccinic acid, disulfosuccinic acid, aryl-succinic acid, sulfofumaric acid, disulfofumaric acid, succinic acid containing sulfobenzoic or sulfoarylcarboxylic acid groups, fumaric acid containing sulfobenzoic or sulfoarylcarboxylic acid groups, their respective salts, and the like.

Alternatively, heterocyclic acids can be used. Nonlimiting examples of such acids include pyrridine carboxylic acids (such as picolinic acid, pyrridine dicarboxylic acid, and the like); pyrrolidone carboxylic acids (such as 2-pyrrolidone-5carboxylic acid).

Optional Additives

Pigment migration inhibitors can be used in the present invention as an optional additive. These inhibitors can be homopolymers or copolymers having any number of hydrophilic monomers, each of whose homopolymers are hydrophilic, so long as the resulting copolymer is sparingly soluble in water. Pigment migration inhibitors are futher disclosed in copending, coassigned, U.S. patent Application Ser. No. 09/099,956(Attorney Docket No. 54191 USA7A), the disclosure of which is incorporated herein by reference.

Nonlimiting examples of hydrophilic monomers are methacrylic, ethacrylic acids, acrylic acid, N-Vinylphthalimide, Vinylimidazole, Vinylpyridine and N-vinyl-2-pyrrolidinone, with the last and acrylic acid being presently preferred. The homopolymer is a polyvinylpyrrolidinone (PVP) of relatively high molecular weight available from commercial sources.

Other ink receptive copolymers that are sparingly soluble in water include a copolymer of N-vinylpyrrolidone, acrylic acid, and trimethoxysilylethylmethacrylate (80/10/10); a copolymer of N-vinylpyrrolidone, acrylic acid, trimethoxysilylethylmethacrylate, and ethyleneoxide acrylate (75/10/5/10); a copolymer of N-vinylpyrrolidone, acrylic acid, and N,N,N-methyloctylheptadecafluorosulfonylethylacrylate (MeFOSEA) (80/10/10); a copolymer of N-vinylpyrrolidone, acrylic acid, trimethoxysilylethylmethacrylate and N,N,N-ethyloctylheptadecafluorosulfonylethylacrylate (MeFOSEA) (83/10/2/5); and); a copolymer of N-vinylpyrrolidone, acrylic acid, and Sulfonated Styrene—Sodium Salt (60/10/30).

Further information about these optional additives can be found in copending, coassigned, U.S. patent application Ser. No. 09/899,983 (Attorney Docket No. 54190USA9A), the disclosure of which is incorporated by reference herein.

USEFULNESS OF THE INVENTION AND EXAMPLES

The role of aluminum sulfate and dioctylsulfosuccinimate-sodium salt has previously been described for fluid management and pigment management in a microporous membrane in copending, coassigned, U.S. patent application Ser. No. 08/892,902 (Waller et al.) (Attorney Docket No. 53473USA1A), the disclosure of which is incorporated by reference herein. These pigment management and fluid management systems are particularly useful for wide-format printers operating on high drop volume (~140 picoliter) e.g., an Encad-Novajet brand printer. The drying agents of the present invention are not as needed for these high drop volume-high drop size printing requirements.

However, as new printers become available with lower drop volumes and lower drop sizes, but more drops per unit area, (also known as dots per inch or "dpi" forming a higher resolution image graphic), such as Hewlett Packard Corporation printers operating on a 30 picoliter drop volume or even smaller than that, the pigmented ink forming the higher resolution image graphic does not dry as rapidly as desired. The drying agents of the present invention, introduced into the same coating solutions as those used to provide the fluid management and the pigment management provide the unexpected advantage of drying to-the-touch pigmented ink nearly instantaneously, fundamentally expanding the opportunity toward even higher resolution image graphics that will not become distorted with physical contact against the image shortly after printing. Thus, this invention improves upon pigment management of the prior copending, coassigned, U.S. patent application Ser. No. 08/892,902 (Waller, Jr. et al.) (Attorney Docket No. 53473USA1A). The drying agents of the present invention induce more rapid stabilization of the pigment particles of the image graphic in and on the microporous membrane otherwise containing the fluid management system and the pigment management system until the advantages of the pigment management system and, optionally, the migration inhibitor can commence. The present invention solves a problem of pigment particle stabilization through interaction with ink components such as humectants that are required for proper passage of the ink through the printing head of the inkjet printer. While not limited to a particular theory, it is believed that drying agents of the present invention interact with humectants through chemical reaction to form esters that do not facilitate smudging of the image graphic. It is believed that, left unreacted, humectants residing in the image graphic will continue to permit smudging because of their low vapor pressure as well as inherent hydrophilicity that will continue to affect the image graphic in high humidity environments even if there is no actual physical contact with the image graphic. An ester formed from the combination of the drying agent and the humectants lacks sufficient hydrophilicity and reduces those properties of the humectant that are no longer needed once the image graphic has been printed. As a result, the potential for the image to smudge is significantly reduced. Moreover, the degree of dryness is, to a large extent, is determined by the type of functional groups attached to the aromatic ring of the drying agents of the present invention, other than the carboxylic groups on such ring.

The invention is further illustrated by the following examples:

The membrane used in this example, namely, an oil-in microporous polypropylene membrane prepared according the disclosures of U.S. Pat. Nos. 4,539,256 (Shipman et al.), 4,726,989 (Mrozinski), and more particularly 5,120,594 (Mrozinski), the disclosures of which are incorporated herein by reference was produced and had the following properties:

| | |
|---|---|
| Bubble point | 0.9 μm |
| Gurley 50 cm³ | 15 sec |
| Porosity % void | 38% |
| Surface wetting Energy (before treatment) | 30 dynes/cm² |
| Caliper | 0.178 mm (7 mil) |

This membrane was impregnated with the following composition:

| | | |
|---|---|---|
| Aluminum sulfate, tetradecahydrate | (Pigment Management) | 4.1% |
| Dioctylsulfosuccinate (Dos³) | (Fluid Management) | 7.0% |
| 5-Sulfoisophthalic Acid-Na(mono) salt | (Drying Agent) | 13.8% |
| PVP/AA | (Migration Inhibitor) | 2.0% |
| Ethanol/IPA | (Solvent) | 25% |
| De-ionized water | (Solvent) | 50.1% |

The composition was coated onto the membrane with a No. 4 Meyer bar. To remove solvent, the composition was dried in a conventional oven at about from 75° C. to about 120° C. for about 1–3 mins. The membrane was printed to form a test image using 30 picoliter drop size thermal inkjet printer (Hewlett Packard 2500 Series printer). The printed medium was laminated with 3M Scotch No. 845 Book Tape, and the laminated medium was adhered to a piece of anodized aluminum. Approximately 75% percent of the laminated image graphic was submerged in water for a period of about 96 hours. During this time of submersion, the image did not show any deterioration due to pigment migration. This example showed that a combination of the drying agent of the present invention with migration inhibitor did not harm the purpose of the migration inhibitor.

The above described work was repeated successfully using yet another microporous membrane prepared using thermally induced phase separation techniques according the disclosures of U.S. Pat. Nos. 4,539,256 (Shipman et al.), U.S. Pat. No. 4,726,989 (Mrozinski), and more particularly U.S. Pat. No. 5,120,594 (Mrozinski), the disclosures of which are incorporated herein by reference. This membrane had the following properties:

| | |
|---|---|
| Bubble point | 0.75 μm |
| Gurley 50 cm³ | 20 sec |
| Porosity % void | 41% |
| Surface wetting Energy (before treatment) | 30 dynes/cm² |
| Caliper | 0.178 mm (7 mil) |

The membrane was impregnated with the following coating solution:

| | | |
|---|---|---|
| Aluminum sulfate, tetradecahydrate | (Pigment Management) | 3.3% |
| Dihexylsulfosuccinate | (Fluid Management) | 6.0% |
| 5-Sulfoisophthalic Acid-Na(mono) salt | (Drying Agent) | 7.0% |
| Phthalic acid | (Drying Agent) | 4.0% |
| PVP/AA | (Migration Inhibitor) | 2.5% |
| Ethanol/IPA | (Solvent) | 26% |
| De-ionized water | (Solvent) | 51.2% |

The composition was obtained as a clear solution by dissolving the ingredients under mild heating. The membrane was impregnated with the clear solution by using a Meyer bar, a roller, by hand-spread or machine coating. The coated membrane was dried at about 75–120° C. for about 1–2 minutes. Then the membrane was imaged using a Hewlett Packard 2500 series printer and provided a very high quality and high-density image which is rapidly dry, tack-free, feathering-free, and smudge-free. The image did not show any movement in any of the ink/color when exposed to water using the same test as done in the prior example.

The example was repeated with another piece of the same membrane, which was also impregnated with another coating solution consisting of:

| | | |
|---|---|---|
| Aluminum sulfate, tetradecahydrate | (Pigment Management) | 5.0% |
| Dicyclohexylsulfosuccinate | (Fluid Management) | 6.0% |
| D,L-2-Pyrrolidone 5-carboxylic acid | (Drying Agent) | 5.0% |
| 5-Hydroxyisophthalic acid | (Drying Agent) | 4.0% |
| Polyvinylpyrrolidone-co-acrylic acid | (Migration Inhibitor) | 2.0% |
| Isopropyl alcohol | (Solvent) | 30% |
| Deionized water | (Solvent) | 48% |

The dry membrane was imaged with an HP 2500 Series Printer to obtain a very high density, dry, and smudge-free image which was resistant to water migration and water spray shortly after printing. Water spray can be analyzed using the following Water Spray Test:

Water Spray Test

Tempered water from a standard 1.90 cm (¾ inch) aerated faucet was allowed to drop 0.61 meters (2 feet) at a rate of 6 liters per minute for 5 minutes onto the coated film sample which was imaged with a test pattern. The sample was moved about so each color area in the test pattern could receive the water stream directly. The sample was removed from the water stream, allowed to dry and observed for ink movement. For ease and documentation of this test, the sample was adhered to an aluminum plate and the test was performed about 10 minutes after printing.

The example was repeated with another piece of the same membrane, which was also impregnated with another coating solution consisting of:

| | | |
|---|---|---|
| Aluminum sulfate, tetradecahydrate | (Pigment Management) | 4.0% |
| Dicyclohexylsulfosuccinate | (Fluid Management) | 4.0% |
| D,L-2-Pyrrolidone 5-carboxylic acid | (Drying Agent) | 2.0% |
| 5-Hydroxyisophthalic acid | (Drying Agent) | 4.0% |
| N-phthaloylglycine | (Drying Agent) | 2.0% |
| Polyvinylpyrrolidone-co-acrylic acid | (Migration Inhibitor) | 2.0% |
| Isopropyl alcohol | (Solvent) | 30% |
| Deionized water | (Solvent) | 52% |

The dry membrane was imaged with an HP 2500 Series Printer to obtain a very high density, dry, and smudge-free image which was resistant to water spray and water migration shortly after printing.

The use of multiple drying agents accommodates the interaction of the pigment manager with various pigments and their dispersants. A balance of drying agent selection(s) should not adversely affect the performance of the pigment manager, the fluid manager, the optional migration inhibitor, or other components in the coating, which when dried in the membrane, becomes the inkjet receptor medium.

The invention is not limited to the above embodiments. The claims follows.

What is claimed is:

1. An inkjet receptor medium suitable for imaging with a pigmented ink, comprising:

a porous membrane of a synthetic polymer;

a pigment management system comprising a multivalent metal salt coating or functionalized particulates impregnated into pores of the porous membrane; and a drying agent impregnated into pores of the porous membrane, wherein the drying agent comprises an aromatic or aliphatic acid having sulfonic, carboxylic, phenolic, hydroxyl, or mixed functionalities thereof.

2. The inkjet receptor medium of claim 1 further comprising a surfactant impregnated into pores of the porous membrane.

3. The inkjet receptor medium of claim 1 wherein the acid is a sulfocarboxylic or a sulfophenolic acid, a pyrrolidone carboxylic acid, a pyridine carboxylic acid, a phthalic acid, or combinations thereof.

4. The inkjet receptor medium of claim 1 wherein the drying agent is an aromatic acid selected from the group consisting of sulfosalicyclic acid, disulfosalicylic acid, sulfophthalic acid, sulfoisophthalic acid, sulfoterephthalic acid, disulfodicarboxylic acid, hydroquinone sulfonic acid, hydroquinone disulfonic acids, sulfocarboxyphenolic acid, hydroxy-phthalic acids, and combinations thereof.

5. The inkjet receptor medium of claim 1 wherein the drying agent is an aliphatic acid selected from the group consisting of sulfosuccinic acid, disulfosuccinic acid, sulfofumaric acid, disulfofumaric acid, succinic acid containing sulfobenzoic or sulfoarylcarboxylic acid groups, fumaric acid containing sulfobenzoic or sulfoarylcarboxylic acid groups, and combinations thereof.

6. The inkjet receptor medium of claim 1 wherein the acid has the formula:

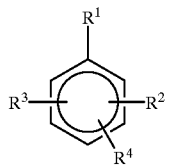

wherein:

$R^1$, $R^2$, $R^3$ is —COOH, —SO$_3$H, or —OH groups, and combinations thereof totaling 3–5 groups; and $R^4$ is H, a fused aromatic ring system, or a —CH$_2$)n—Ar, O—Ar, —S—Ar, —NH—Ar, —NHCO—Ar, —CO—Ar wherein n is 0–3 and Ar is an aromatic group optionally including 3–5 $R^1$, $R^2$, $R^3$ groups.

7. The inkjet receptor medium of claim 1 wherein the porous membrane of a synthetic polymer is a microporous membrane with tortuous paths.

8. The inkjet receptor medium of claim 1 wherein the porous membrane of a synthetic polymer is a thermally induced phase separated microporous membrane.

9. The inkjet receptor medium of claim 1 wherein the functionalized particulates comprise fluorinated silica agglomerates.

10. The inkjet receptor medium of claim 1 wherein comprising a migration inhibitor impregnated into pores of the porous membrane.

11. The inkjet receptor medium of claim 10 wherein the migration inhibitor comprises a hydrophilic homopolymer or a copolymer comprising at least two different copolymerized monomers whose homopolymers are hydrophilic.

12. The inkjet receptor medium of claim 11 wherein the hydrophilic homopolymer is polyvinylpyrrolidinone.

13. The inkjet receptor medium of claim 11 wherein the monomers are selected from the group consisting of methacrylic acid, ethacrylic acid, acrylic acid, N-vinylphthalimide, vinylimidazole, vinylpyridine, N-vinyl-2-pyrrolidinone, and combinations thereof.

14. The inkjet receptor medium of claim 1 further comprising an image formed from a pigmented ink.

15. A method of forming an image, the method comprising: providing an inkjet receptor medium of claim 1, and delivering a pigmented ink to the inkjet receptor medium.

16. An inkjet receptor medium suitable for imaging with a pigmented ink, comprising:

a porous membrane of a synthetic polymer;

a multivalent metal salt coating and a surfactant impregnated into pores of the porous membrane; and a drying agent impregnated into pores of the porous membrane, wherein the drying agent comprises an aromatic or aliphatic acid having sulfonic, carboxylic, phenolic, hydroxyl, or mixed functionalities thereof.

17. The inkjet receptor medium of claim 16 wherein the porous membrane of a synthetic polymer is a microporous membrane with tortuous paths.

18. The inkjet receptor medium of claim 17 wherein the porous membrane of a synthetic polymer is a thermally induced phase separated microporous membrane.

19. The inkjet receptor medium of claim 16 wherein the drying agent comprises:

an aromatic acid selected from the group consisting of sulfosalicyclic acid, disulfosalicylic acid, sulfophthalic acid, sulfoisophthalic acid, sulfoterephthalic acid, disulfodicarboxylic acid, sulfophenolic acid, hydroquinone sulfonic acid, hydroquinone disulfonic acids, sulfocarboxyphenolic acid, hydroxy-phthalic acids, and combinations thereof;

an aliphatic acid selected from the group consisting of sulfosuccinic acid, disulfosuccinic acid, sulfophthalic acid, disulfofumaric acid, succinic acid containing sulfobenzoic or sulfoarylcarboxylic acid groups, fumaric acid containing sulfobenzoic or sulfoarylcarboxylic acid groups, and combinations thereof;

a heterocyclic acid selected from the group consisting of pyrridine carboxylic acids, pyrrolidone carboxylic acids, and combinations thereof;

or combinations thereof.

20. The inkjet receptor medium of claim 16 futher comprising an image formed from a pigmented ink.

21. A method of forming an image, the method comprising:

providing an inkjet receptor medium of claim 16; and delivering a pigmented ink to the inkjet receptor medium.

22. An inkjet receptor medium suitable for imaging with a pigmented ink, comprising:

a porous membrane of a synthetic polymer;

a multivalent metal salt coating and a surfactant impregnated into pores of the porous membrane; and a drying agent impregnated into pores of the porous membrane, wherein the drying agent comprises an aromatic acid having the formula:

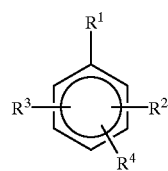

wherein:
$R^2, R^2, R^3$ is —COOH, —SO$_3$H, or —OH groups, and combinations thereof totaling 3–5 groups; and
$R^4$ is H, a fused aromatic ring system, or a —(CH$_2$)$_n$—Ar, —O—Ar, —S—Ar, —NH—Ar, —NHCO—Ar, —CO—Ar wherein n is 0–3 and Ar is an aromatic group optionally including 3–5 $R^1$, $R^2$, $R^3$ groups.

23. An inkjet receptor medium suitable for imaging with a pigmented ink, comprising:
a porous membrane of a synthetic polymer;
a pigment management system comprising a multivalent metal salt coating impregnated into pores of the porous membrane; and
a drying agent impregnated into pores of the porous membrane, wherein the drying agent comprises an aromatic or aliphatic acid selected from the group consisting of a sulfocarboxylic acid, a sulfophenolic acid, a pyrrolidone carboxylic acid, a pyrridine carboxylic acid, a phthalic acid, and combinations thereof.

24. An inkjet receptor medium comprising:
a porous substrate;
a pigment management system comprising functionalized particulates in contact with surfaces of pores of the porous substrate; and
a drying agent in contact with surfaces of pores of the porous substrate, wherein the drying agent comprises an aromatic or aliphatic acid having sulfonic, carboxylic, phenolic, hydroxyl, or mixed functionalities thereof.

25. The inkjet receptor medium of claim 24, further comprising an image formed from a pigmented ink.

* * * * *

UNITED STATES PATENT AND TRADEMARK OFFICE
CERTIFICATE OF CORRECTION

PATENT NO.     : 6,383,612 B1
DATED          : May 7, 2002
INVENTOR(S)    : Waller, Clinton P. Jr.

It is certified that error appears in the above-identified patent and that said Letters Patent is hereby corrected as shown below:

Column 2,
Line 39, delete "fast," and insert in place thereof -- fast; --.
Line 44, delete "CaCi$_2$" and insert in place thereof -- CaCl$_2$ --.

Column 3,
Line 49, delete "physicochemically" and insert in place thereof -- physiochemically --.
Line 58, delete "media,comprising" and insert in place thereof -- media, comprising --.

Column 6,
Line 20, delete "multivalent," and insert in place thereof -- multivalent salt, --.
Line 38, after the word "combination" insert the word -- thereof --.
Lines 62-63, delete the phrase "in the chain".

Column 7,
Line 26, delete "5carboxylic" and insert in place thereof -- 5-carboxylic --.
Line 56, delete "and);" and insert in place thereof -- and; --.

Column 8,
Line 54, after "extent," delete the word "is".

Column 9,
Line 38, after the word "according" insert the word -- to --.

Signed and Sealed this

Twenty-eighth Day of January, 2003

JAMES E. ROGAN
*Director of the United States Patent and Trademark Office*